United States Patent Office 2,737,205
Patented Mar. 6, 1956

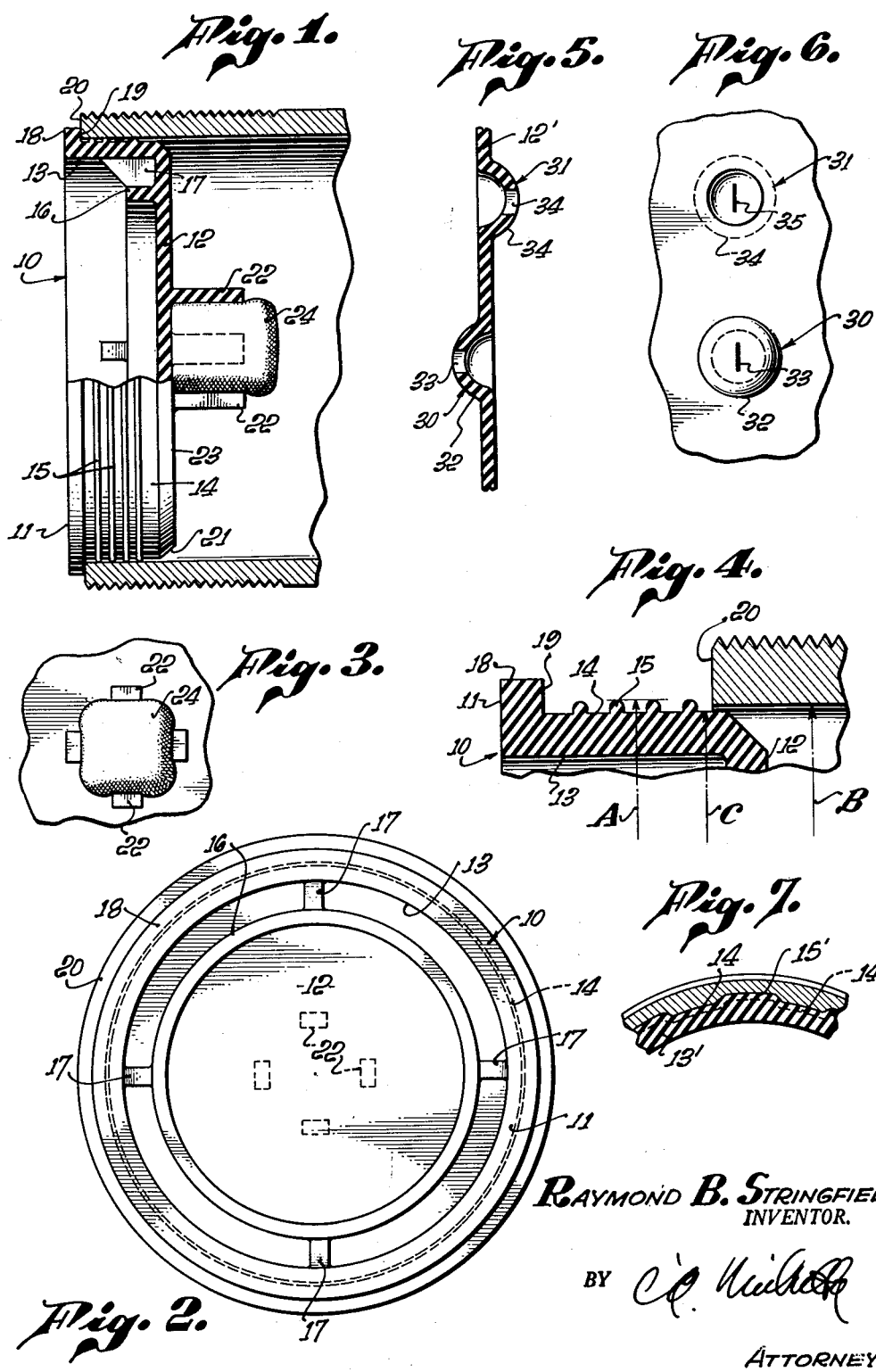

2,737,205

MEANS FOR PROTECTIVELY ISOLATING INTERNAL PIPE SURFACES

Raymond B. Stringfield, Los Angeles, Calif., assignor to Fullerton Manufacturing Company, Fullerton, Calif., a corporation of California Application August 28, 1952, Serial No. 306,881

14 Claims. (Cl. 138—89)

This invention relates to the storage protection of pipe and more particularly to a means for isolating interior surfaces of metal pipe from variant atmosphere conditions so as to prevent corrosion and fouling thereof during storage.

Metal pipe, because of its length and size, may be stored for periods of time in the open where it is subjected to varying weather conditions. When stored outside, exterior surfaces of the pipe may be adequately protected by painting the pipe with well-known corrosion and rust resistant protective coatings. External threaded ends of pipe may be protected by threading a coupling. However, interior surfaces of pipe are usually not protected against corrosion and fouling because of the difficulty and expense in applying a protective coating completely and uniformly to an interior surface of pipe which may be from 5 to 20 feet or more in length.

Open-ended pipe stored outside is subject to daily changes of temperature, humidity and pressure. During the day, direct rays of the sun upon the pipe raise the temperature of the metal and serve to drive out humidity or moisture within the pipe. During the night, the pipe becomes cool and humid night air is drawn into the pipe, and moisture collects and condenses on interior pipe surfaces. This repeated daily change of temperature and humidity rapidly affects the interior surface of metal pipe and causes corrosion and fouling. Moreover birds, rodents, insects, etc., frequently enter and contaminate open pipe in storage, and dust and filth are blown in by air currents or introduced by carelessness in handling. Corrosion and fouling results in a pipe having a weaker and non-uniform wall structure. Before such corroded pipe can be used, it must be carefully and thoroughly cleaned to prevent contamination of fluid which is to be conducted by the pipe. Such cleaning is difficult because the interior pipe surfaces are virtually inaccessible.

This invention contemplates means for sealing open-ended metal pipe and which is responsive to diurnal temperature changes without loss of an effective seal. The invention contemplates a resilient closure for each open pipe end. The closure includes a flexible thin central disc portion which is responsive to pressure variations within the pipe, the disc portion being connected to a reinforcing cylindrical wall portion in such a manner that an expansible seal between the cylindrical wall portion and opposed interior surfaces of the pipe is not disturbed. The invention contemplates a means for sealing open-ended pipe which is capable of and adapted to carry a means for dehydrating the closed interior of the pipe. It also contemplates a means for controllably releasing or admitting air to the pipe or container when necessitated by large expansion and contraction due to major temperature changes.

The primary object of this invention is to design and provide a simple, effective means for preventing corrosion and fouling of interior surfaces of pipe in storage.

An object of this invention is to design and provide a means for isolating the interior of a pipe from external air so as to prevent accumulation within the pipe of humid air which tends to condense upon and corrode interior pipe surfaces.

A further object of this invention is to design and provide a means for protecting and isolating interior surfaces of pipe wherein the closure means is adapted to carry means for dehydrating air within the pipe.

A further object of this invention is to design and provide a resilient pipe seal or closure for an end of a pipe which is readily formed as by molding suitable rubber or synthetic rubber composition material and which is capable of effectively and tightly sealing the end of pipe which is exposed to variant atmospheric conditions.

While protection of pipe is a primary consideration, other uses are also contemplated such as the protection of the barrels of cannon or machine guns when not in use, the closure of hand holes and other openings in storage vessels or containers of various types, and the closure of ports, connections and drains on engines and other machinery in storage or in transit.

Generally speaking, this invention contemplates a means for isolating and protecting interior pipe surfaces which comprises a unitary, one-piece, cup-shaped element having a thin, flexible, central, disc-shaped portion adapted to respond as by flexing to pressure variations within the pipe. Connected to the disc-shaped portion is a cylindrical portion having an external cylindrical surface provided with a plurality of continuous, circumferential, resilient beads in spaced relation, the circumference of the beads being slightly greater than the inner circumference of the pipe to be protected so that the beads resiliently expand against opposed interior surfaces of the pipe. The cup-shaped element is stiffened against collapse or deformation in the planar zone of the element by a circular stiffening rib spaced inwardly from the cylindrical portion a distance of about 0.1 to 0.4 times the radius of the inside cylindrical surface of the cylindrical portion. A plurality of spaced radial webs may extend between the rib and the cylindrical portion. The cylindrical portion may be provided with an outwardly extending flange which is adapted to abut a portion of the edge face of a pipe to which the element is applied. Extending inwardly from one surface of the disc portion may be a plurality of spaced fingers which are adapted to resiliently hold a container of suitable dehydrating material such as silica gel.

When desired the resilient disc or diaphragm may be provided with one or more valves to permit escape of air if internal pressure is increased or entrance of air to relieve a drop in pressure, and the inlet valve may be designed to admit air through a container of suitable dehydrating material such as silica gel.

The closure means may normally be made of a rubber or synthetic rubber composition of suitable stiffness and resilience, but may, when necessary, be made from special rubber or plastic compositions designed to resist oil or other chemicals or to remain serviceable at extremely low or extremely high temperatures, or to resist sunlight ozone, fungus or other exposures.

Other objects and advantages of this invention will be readily apparent from the following description of the drawings in which an exemplary embodiment of this invention is illustrated.

In the drawings:

Fig. 1 is a fragmentary sectional view of a pipe end provided with a pipe closure embodying this invention, the pipe closure being shown half in section.

Fig. 2 is a view taken from the left of Fig. 1 and showing a front face of the pipe closure.

Fig. 3 is a fragmentary view of the central portion of the rear face of the pipe closure.

Fig. 4 is a fragmentary enlarged sectional view of a portion of the closure and pipe end.

Fig. 5 is a fragmentary enlarged sectional view of a modification of a pipe closure means embodying this invention.

Fig. 6 is a front view of the modification shown in Fig. 5.

Fig. 7 is still another modification of the pipe closure means embodying this invention.

The closure means or pipe closure generally indicated at 10, is adapted to be readily manually inserted within an open pipe end and may be made of any suitable rubber, synthetic rubber, or rubber composition. The closure means 10 is constructed and formed in such a manner that it may be readily molded in one integral piece.

The closure means 10 comprises a unitary, one piece integral cup-shaped element 11 provided with a circular disc-shaped portion 12 having a thin flexible section adapted to extend transversely between walls of a pipe. The disc-shaped portion 12 is adapted to flex inwardly and outwardly in response to variations in pressure within a pipe having ends closed by the closure means 10.

The disc-shaped portion 12 is connected at its circumference or periphery to a cylindrical portion 13 extending in one direction outwardly and away from the plane of the disc-shaped portion 12. The cylindrical portion 13 includes an external cylindrical surface 14 interrupted by a plurality of axially spaced, annular, continuously circumferential resilient beads 15. The beads 15 are provided with an outermost circumference having a radius A (Fig. 4) greater than the inner radius B of a pipe having an end to be closed. The external surface 14 has a radius C slightly less than the inner radius B of a pipe to be closed. Thus the resilient beads 15 are adapted to be placed under compression when pipe closure 10 is inserted into the open end of a pipe, and when within such open pipe end the resilient beads 15 frictionally engage and expansively press against the opposed internal surfaces of the pipe to provide an effective tight seal.

The closure means 10 is reinforced against deformation or collapse along a diameter of disc portion 12 by a circular stiffening rib 16 formed integral with disc portion 12 adjacent to its outer peripheral margin. The stiffening rib 16 may be spaced radially inwardly from the inner surface of the cylindrical portion 13 a distance from about 0.1 to 0.4 times the radius of the inner cylindrical surface of portion 13. The stiffening rib 16 extends away from the plane of the disc portion in the same direction as the cylindrical portion 13. It will be apparent that rib 16 not only resists deformation of the closure means 10 along a diameter but provides for a large central disc portion 12 which is capable of flexing in response to pressure within a closed pipe without disturbing or influencing the seal that resilient beads 15 make with interior opposed surfaces of the pipe. The disc portion may flex and the cylindrical portion will not be deformed because of such flexing.

The cylindrical portion 13 may be additionally reinforced by a plurality of circularly spaced radial webs 17 which extend between and are integrally formed with the cylindrical portion 13 and stiffening rib 16. The radial webs serve to increase the expansive pressure of the beads against the internal surfaces of the pipes. As illustrated, the radial webs 17 are spaced apart approximately 90°. It is understood that the spacing between the radial webs and the number of radial webs employed may be varied as desired.

The cylindrical portion 13 also includes a radially outwardly extending peripheral flange 18 formed at the front end thereof. The rear face of flange 18 is adapted to abut as at 19 against an edge face 20 of a pipe to be closed. It should be noted that flange 18 has an outer diameter less than the outer diameter of the pipe to be closed, thus permitting the closure means 10 to be inserted into an open pipe end under virtually any condition of storage. For example, pipe is usually stored in tiers with pipes in contact with each other. In order to close ends of such pipe it is not possible to apply a cap which has a lip portion adapted to extend over and overlie ends of the pipe because of pipe contact. Since flange 18 has an outer diameter less than the outer diameter of a pipe to be closed, flange 18 permits the closure means 10 to be readily inserted into an open pipe end and to position the closure means 10 therein in sealing relationship without interference with or disturbing other pipe.

To facilitate and guide insertion of closure means 10 into a pipe end, the cylindrical portion 13 may be provided at its inner or back end with a tapered, annular face 21.

A plurality of resilient rearwardly extending spaced fingers 22 may be formed on back face 23 of the disc-like portion 12. The spaced resilient fingers 22 are adapted to carry a suitable container or receptacle 24 holding a suitable adsorbent material or composition, such as silica gel, for dehydration of air within a closed pipe. The resilient fingers 22 are connected to the disc-like portion 12 over a relatively small area so that their formation thereon will not interfere with the flexing of the disc-like portion 12 in response to pressure changes within the pipe.

The modification of this invention shown in Fig. 5 differs from the above-described embodiment in that the central flexible disc portion 12' is provided with valve means 30 and 31 for respectively releasing and admitting air from and to the interior of the pipe. It is understood that either one or both of the valve means shown and described may be employed with the pipe closure means of this invention, depending upon the particular temperature conditions encountered in the vicinity where the pipe is stored. Where temperature differential between day and night is extremely great, it may be desirable to employ both valve means, whereas where the temperature differential is not substantial, the valve means for releasing air from the pipe may be of itself sufficient.

The outlet valve means 30 is preferably located in the central portion of disc portion 12' where the greatest amount of deflection of the disc portion 12' occurs in response to variant pressures within the pipe. The valve means 30 comprises a preformed, molded, outwardly directed, generally partially spherical protuberance 32 having curved walls with a convex outer face and a concave inner face forming a recess in the inwardly directed face of the pipe closure means. An incision may be made, as by a thin knife blade, in protuberance 32 so as to form a slit 33 extending entirely through the protuberance. Since the protuberance is made of the same material as the flexible disc portion, the slit 33 is normally maintained tightly closed by the curved wall of elastic resilient material forming the protuberance.

In operation, the outlet valve means 30 acts to automatically relieve excessive air pressures created within the pipe and when these pressures are relieved, the valve means 30 automatically self-closes to prevent introduction of outside air into the pipe. When the pressures within the pipe increase so as to cause outward flexing of the central disc portion 12', the protuberance 32 is also outwardly flexed and because of its partially spherical configuration, the outward flexing of the curved walls thereof automatically causes opening of the slit 33 so as to release air from within the pipe. Upon release, the resilient curved construction of the protuberance 32 causes the slit to be automatically closed.

Inlet valve means 31 are also illustrated in Fig. 5 and may be provided adjacent to the outlet valve means 30. The inlet valve means 31 is constructed in substantially the same manner as the outlet valve means with the exception that the partially spherical protuberance 34 and the slit 35 extending therethrough are oppositely directed so as to face the interior of the pipe. Thus, when cooling air within the pipe causes inward flexing of the flexible disc portion 12', such inward flexing automatically opens slit 35 in a similar manner as that described for the outlet valve means so as to introduce air into the pipe. Thus, subnormal air pressures within the pipe are limited in their "sucking in" action upon the pipe closure means so that the pipe closure means will not be distorted and will remain in desired sealed relationship to the pipe end.

To prevent introduction of moist air through the inlet valve means to the interior of the pipe, the inlet valve means may be associated with externally mounted dehydrating or adsorbent means, such as silica gel, so that when air is introduced into the interior of the pipe, such air will have already been dehumidified. Such adsorbent means may be carried internally or externally of the inlet valve means by a plurality of spaced fingers as shown in the first embodiment, or by any other suitable means.

In Fig. 7 is illustrated an embodiment of this invention which may be utilized for sealing ends of guns or rifle barrels having internal rifling defined by lands and grooves. The external surface 14 of the cylindrical portion 13' may be molded to correspond to the configuration of the lands and grooves so that the external surface 14' of the cylindrical portion together with the annular resilient beads 15' thereon may closely fit the configuration of the inner periphery of the rifle barrel.

It is understood that the pipe closure means of this invention is not to be limited to cup-shaped elements having a circular disc portion and a cylindrical flange portion integral with the disc portion. Hollow members having internal surfaces to be protected may have square, rectangular, elliptical or other form of end opening. This invention contemplates a closure means which may be integrally molded into a cup-shape having a central flexible portion and a peripheral flange portion connected to the central portion for fitting virtually any form of opening on a hollow member to be protected. Muzzles of cannon (such as naval, rifled cannon) may be plugged with devices of this invention, the device having a crenelated contour (plan view) or periphery, including portions extending into the rifling channels to properly seal the muzzle against spray, humidity, etc. The term "pipe" as used in the claims, includes tubing, gun barrels and other hollow members.

It will thus be readily apparent that a pipe closure or closure means for open-ended pipe has been provided which may be readily and quickly inserted in pipe open ends in order to isolate and protect the internal surfaces of the pipe from atmospheric variations. The provision of a plurality of spaced, continuous circular beads which are adapted to expand and press against opposed internal surfaces of pipe provides a tight effective seal because the resilient beads are capable of adapting themselves to the usual irregularities in the internal surface of pipe. The pipe closure may be readily removed by grasping flange 18.

It is understood that numerous other modifications and changes may be made in the particular construction of the pipe closure means illustrated above and all such changes and modifications, coming within the scope of the depending claims, are embraced thereby.

I claim:

1. Means for protecting and isolating the interior of a length of pipe to inhibit corrosion and fouling which comprises: a unitary, one-piece cup-shaped element made of resilient composition, having a circular, disc-shaped portion adapted to extend transversely of a pipe, said disc-shaped portion being sufficiently thin to flex into concave and convex form under the influence of variations in pressure of air in a pipe; a cylindrical portion connected to the disc-shaped portion and extending in one direction away from the plane of the disc-shaped portion, said cylindrical portion being provided with an external surface having a plurality of continuous circumferential, resilient beads in spaced relation, said beads being integral with the cylindrical portion and being adapted to frictionally engage and expansively press against the internal surface of a pipe; a circular stiffening rib extending from said disc-shaped portion in the same direction as said cylindrical portion and concentric thereto, said rib being spaced from the inside surface of the cylindrical portion; a plurality of radial webs connecting the stiffening rib with the cylindrical portion; and an outwardly extending flange carried by an end of the cylindrical portion adapted to abut the end of a pipe in which the element is inserted.

2. Means for protecting and isolating the interior of a length of pipe to inhibit corrosion and fouling which comprises: a unitary, one-piece cup-shaped element made of resilient composition, having a circular, disc-shaped portion adapted to extend transversely of a pipe, said disc-shaped portion being sufficiently thin to flex into concave and convex form under the influence of variations in pressure of air in a pipe; a cylindrical portion connected to the disc-shaped portion and extending in one direction away from the plane of the disc-shaped portion, said cylindrical portion being provided with an external surface having a plurality of continuous circumferential, resilient beads in spaced relation, said beads being integral with the cylindrical portion and being adapted to frictionally engage and expansively press against the internal surface of a pipe; a circular stiffening rib extending from said disc-shaped portion in the same direction as said cylindrical portion, said rib being spaced from the inside surface of the cylindrical portion between about 0.1 and 0.4 of the radius of said inside surface of the cylindrical portion; a plurality of radial webs connecting the stiffening rib with the cylindrical portion to increase the expansive pressure of the beads against the internal surfaces of a pipe into which the element is inserted; and an outwardly extending flange carried by an end of the cylindrical portion adapted to abut the end of a pipe in which the element is inserted.

3. Means for protecting and isolating the interior of a length of pipe to inhibit corrosion and fouling which comprises: a unitary, one-piece cup-shaped element made of resilient composition, having a circular, disc-shaped portion adapted to extend transversely of a pipe, said disc-shaped portion being sufficiently thin to flex into concave and convex form under the influence of variations in pressure of air in a pipe; a cylindrical portion connected to the disc-shaped portion and extending in one direction away from the plane of the disc-shaped portion, said cylindrical portion being provided with an external surface having a plurality of continuous circumferential, resilient beads in spaced relation, said beads being integral with the cylindrical portion and being adapted to frictionally engage and expansively press against the internal surface of a pipe; a circular stiffening rib extending from said disc-shaped portion in the same direction as said cylindrical portion, said rib being spaced from the inside surface of the cylindrical portion; and a plurality of radial webs connecting the stiffening rib with the cylindrical portion.

4. Means for protecting and isolating the interior of a length of pipe to inhibit corrosion and fouling which comprises: a unitary, one-piece cup-shaped element made of resilient composition, having a circular, disc-shaped portion adapted to extend transversely of a pipe, said disc-shaped portion being sufficiently thin to flex into concave and convex form under the influence of variations in pressure of air in a pipe; a cylindrical portion connected to the disc-shaped portion and extending in one direction away from the plane of the disc-shaped portion, said cylindrical portion being provided with an external surface having a plurality of continuous circumferential, resilient beads in spaced relation, said beads being integral with the cylindrical portion and being adapted to frictionally engage and expansively press against the internal surface of a pipe; a circular stiffening rib extending from circumferential margins of said disc-shaped portion in the same direction as said cylindrical portion, said rib being spaced from the inside surface of the cylindrical portion and forming with the cylindrical portion and said margins a U-section of material; and an outwardly extending flange carried by an end of the cylindrical portion adapted to abut the end of a pipe in which the element is inserted.

5. Means for protecting and isolating the interior of a length of pipe to inhibit corrosion and fouling which comprises: a unitary, one-piece cup-shaped element made of resilient composition, having a circular, disc-shaped portion adapted to extend transversely of a pipe, said disc-shaped portion being sufficiently thin to flex into concave and convex form under the influences of variations in pressure of air in a pipe; a cylindrical portion connected to the disc-shaped portion and extending in one direction away from the plane of the disc-shaped portion, said cylindrical portion being provided with an external surface having a plurality of annular resilient beads in spaced relation having an outer circumference greater than the inner circumference of the pipe to be protected; a circular stiffening rib extending from circumferential margins of said disc-shaped portion, said rib being spaced from the inside surface of the cylindrical portion in the same direction as said cylindrical portion; and an outwardly extending flange carried by an end of the cylindrical portion adapted to abut the end of a pipe in which the element is inserted.

6. Means for protecting and isolating the interior of a hollow open-ended member to inhibit corrosion and fouling which comprises: a one-piece cup-shaped element made of resilient composition having a flexible central portion adapted to extend transversely of the hollow member, said central portion being sufficiently thin to flex into concave and convex form under the influences of variations in pressure of air in the hollow member; a peripheral flanged portion connected to the central portion and extending in one direction away from the plane of the central portion, said flanged portion having an external surface provided with a plurality of outwardly directed resilient beads in spaced relation having an outer dimension greater than the inner dimension of the hollow member to be protected; and a continuous rib concentric to said flanged portion and extending from one circumferential marginal surface of said central portion in the same direction as said flanged portion.

7. Means for protecting and isolating the interior of a hollow open-ended member to inhibit corrosion and fouling which comprises: a one-piece cup-shaped element made of resilient composition having a flexible central portion adapted to extend transversely of the hollow member, said central portion being sufficiently thin to flex into concave and convex form under the influences of variations in pressure of air in the hollow member; a peripheral flanged portion connected to the central portion and extending in one direction away from the plane of the central portion, said flanged portion having an external surface provided with a plurality of outwardly directed resilient beads in spaced relation having an outer dimension greater than the inner dimension of the hollow member to be protected; a continuous stiffening rib integral with circumferential margins of the central portion extending in the same direction as and spaced radially inwardly of the peripheral flanged portion; and spaced radial portions connecting said rib and said peripheral flanged portion.

8. Means as defined in claim 7 wherein valve means are formed integrally with said central portion for opening and closing in response to variations in pressure in said hollow member.

9. Means as defined in claim 8 wherein said valve means includes a protuberance extending away from the central portion and having a curved wall and a normally closed slit in said curved wall.

10. Means as defined in claim 7 wherein inlet and outlet valve means including slitted oppositely directed valved protuberances are integrally formed in spaced relation on said central portion.

11. Means as defined in claim 7 wherein valve means are formed integrally with said central portion for response to variations in pressure within said hollow member, and adsorbent means are carried by the element adjacent to the valve means for absorbing moisture from air passing through the valve means.

12. Means as defined in claim 7, wherein the external surface of the peripheral flanged portion is crenelated and the beads thereon are adapted to contact walls of rifling channels of the hollow member.

13. A closure means for an end of a hollow, open-ended member comprising: a cup-shaped element of resilient composition having a flexible thin section central portion to extend transversely of a hollow member and adapted to be responsive to pressure variations in said hollow member; a peripheral flanged portion connected to said flexible central portion and having an external surface provided with spaced radially outwardly directed resilient means to engage and to expand against the hollow member; and annular rib reinforcing means connected to margins of said central portion adjacent the flanged portion and extending in the same direction as said flanged portion.

14. A closure means for an end of a hollow open-ended member comprising: a cup-shaped element of resilient material including a relatively thin section flexible transverse wall adapted to be responsive to pressure variations within said member, and a peripheral flange integral with the wall and extending therefrom in one direction, said peripheral flange having means thereon to engage and expand against the hollow member; and a stiffening rib integral with peripheral margins of the transverse wall spaced from the flange, and forming with the flange and said peripheral margins a U-section of material at said peripheral margins of the wall.

References Cited in the file of this patent

UNITED STATES PATENTS

| | | |
|---|---|---|
| 1,815,957 | Shrom | July 28, 1931 |
| 1,837,345 | Thomas | Dec. 22, 1931 |
| 1,906,182 | Riney | Apr. 25, 1933 |
| 2,168,734 | Freeman | Aug. 8, 1939 |
| 2,196,785 | Takiguchi | Apr. 9, 1940 |
| 2,277,713 | Parker | Mar. 31, 1942 |
| 2,304,532 | Boxley | Dec. 8, 1942 |
| 2,317,882 | Boesel | Apr. 27, 1943 |
| 2,325,809 | Stephansko | Aug. 3, 1943 |
| 2,551,834 | Ferguson | May 8, 1951 |
| 2,628,738 | Hilldale | Feb. 17, 1953 |

FOREIGN PATENTS

| | | |
|---|---|---|
| 352,336 | Great Britain | July 9, 1931 |
| 485,622 | Canada | Aug. 12, 1952 |